(12) United States Patent
Lanham et al.

(10) Patent No.: US 8,215,184 B2
(45) Date of Patent: Jul. 10, 2012

(54) CORIOLIS FLOW METER WITH AN IMPROVED BALANCE SYSTEM

(75) Inventors: Gregory Treat Lanham, Longmont, CO (US); Christopher A. Werbach, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 50 days.

(21) Appl. No.: 12/865,199

(22) PCT Filed: Feb. 20, 2008

(86) PCT No.: PCT/US2008/054442
§ 371 (c)(1),
(2), (4) Date: Jul. 29, 2010

(87) PCT Pub. No.: WO2009/105096
PCT Pub. Date: Aug. 27, 2009

(65) Prior Publication Data
US 2010/0326203 A1  Dec. 30, 2010

(51) Int. Cl.
*G01F 1/84* (2006.01)

(52) U.S. Cl. ................................. 73/861.354
(58) Field of Classification Search ............. 73/861.354
See application file for complete search history.

(56) References Cited

U.S. PATENT DOCUMENTS

| | | | |
|---|---|---|---|
| 6,354,154 B1 * | 3/2002 | Van Cleve et al. | ....... 73/861.357 |
| 6,477,902 B1 | 11/2002 | Oosawa et al. | |
| 6,516,674 B1 | 2/2003 | Poremba | |

FOREIGN PATENT DOCUMENTS

| | | |
|---|---|---|
| WO | 2006014153 A1 | 2/2006 |
| WO | 2007074014 A1 | 7/2007 |

* cited by examiner

*Primary Examiner* — Jewel V Thompson
(74) *Attorney, Agent, or Firm* — The Ollila Law Group LLC (57) ABSTRACT

A flow meter (200) includes a flow tube (210) and a balance system (211). The balance system (211) is coupled to the flow tube (210). Both the flow tube (210) and the balance system (211) have a center of mass. The balance system (211) is sized and located such that the combined center of mass ($C_{cm}$) of the flow tube (210) and the balance system (211) lies proximate an axis of rotation of the flow tube (210).

20 Claims, 5 Drawing Sheets

CORIOLIS FLOW METER WITH AN IMPROVED BALANCE SYSTEM

TECHNICAL FIELD

The present invention relates to flow meters, and more particularly, to a flow meter with an improved balance system.

BACKGROUND OF THE INVENTION

Vibrating conduit sensors, such as Coriolis mass flow meters, typically operate by detecting motion of a vibrating conduit that contains a material. Properties associated with the material in the conduit, such as mass flow, density and the like, in the conduit may be determined by processing signals from motion transducers associated with the conduit, as the vibration modes of the vibrating material-filled system generally are affected by the combined mass, stiffness, and damping characteristics of the conduit and the material contained therein.

A typical Coriolis mass flow meter includes one or more conduits that are connected inline in a pipeline or other transport system to convey material, e.g., fluids, slurries and the like, in the system. Each conduit may be viewed as having a set of natural vibration modes including, for example, simple bending, torsional, radial, and coupled modes. In a typical Coriolis mass flow measurement application, a conduit is excited in one or more vibration modes as a material flows through the conduit, and the motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring the time delay or phase differences between motion at the transducer locations.

The magnitude of the time delay is very small; often measured in nanoseconds. Therefore, it is necessary to have the transducer output be very accurate. Transducer accuracy may be compromised by nonlinearities and asymmetries in the meter structure or from motion arising from extraneous forces. For example, a Coriolis mass flow meter having unbalanced components can vibrate its case, flanges, and the pipeline at the drive frequency of the meter. This vibration perturbs the time delay signal in an amount that depends on the rigidity of the mount. Since the rigidity of the mount is generally unknown and can change over time and temperature, the effects of the unbalanced components cannot be compensated and may significantly affect meter performance. The effects of these unbalanced vibrations and mounting variations are reduced by using flow meter designs that are balanced and by using signal processing techniques to compensate for unwanted component motion.

Typical dual tube Coriolis flow meter designs split the flow of material into two streams using manifolds and send the two streams of material into the flow tubes. The two tubes are typically symmetrical in shape and mounted parallel to one-another. The two tubes typically vibrate at the same frequency but in opposite phase. Because the tubes are symmetrical and vibrated opposite each other, the vibrations typically cancel out where the two tubes are joined. This creates a balanced flow meter (i.e., little or no vibration of the meter at the manifolds). A change in density in the material flowing through the two tubes changes the mass of both tubes equally and therefore, the two tubes remain balanced across a wide range of material densities.

There are certain applications where dual tube meters are not wanted due to pressure drop or plugging issues, in these cases a single tube meter is desirable. The problem with single tube Coriolis flow meters is that they can become imbalanced with changing fluid densities. As the fluid density changes the center of mass of the flow meter also changes. This imbalance can have adverse effects on the meter's performance and reliability.

Therefore, there is a need in the art for a single tube Coriolis flow meter that is capable of staying balanced over a wide range of material densities. The present invention overcomes this and other problems and an advance in the art is achieved. It should be appreciated however, that while the present invention overcomes difficulties that are particularly prevalent with single tube designs, the invention is equally applicable to dual tube meters.

ASPECTS

In one aspect of the invention, a flow meter, comprising:
a flow tube (210); and
a balance system (211) coupled to the flow tube (210), wherein the balance system (211) is sized and located such that the combined center of mass ($C_{cm}$) of the flow tube (210) and the balance system (211) lies proximate an axis of rotation of the flow tube (210).

Preferably, the balance system comprises a balance bar and one or more brace bars.

Preferably, the balance system comprises one or more weighted sleeves.

Preferably, the flow meter comprises a Coriolis flow meter.

Preferably, the flow meter comprises two or more flow tubes.

In one aspect of the invention, a flow meter (400), comprising:
a flow tube (210);
a driver (420);
one or more pickoffs (421, 422); and
a balance system (211) coupled to the flow tube (210), wherein the balance system (211) is sized and located such that the combined center of mass ($C_{cm}$) of the flow meter (400) lies proximate an axis of rotation of the flow tube (210).

Preferably, the balance system comprises a balance bar and one or more brace bars.

Preferably, the balance system comprises one or more weighted sleeves.

Preferably, the flow meter comprises a Coriolis flow meter.

Preferably, the flow meter comprises two or more flow tubes.

In one aspect of the invention, a method for balancing a flow meter having at flow tube, the method comprising the steps of:
coupling a balance system to the flow tube with the balance system sized and located such that the combined center of mass of the flow tube and the balance system lies proximate an axis of rotation of the flow tube.

Preferably, the balance system comprises a balance bar and one or more brace bars.

Preferably, the balance system comprises one or more weighted sleeves.

Preferably, the flow meter comprises a Coriolis flow meter.

Preferably, the flow meter comprises two or more flow tubes.

In one aspect of the invention, a method for balancing a flow meter having a flow tube and a drive system, the method comprising the steps of:
coupling a balance system to the flow conduit with the balance system sized and located such that the combined center of mass of the flow tube, the drive system, and the balance system lies proximate an axis of rotation of the flow tube.

Preferably, the balance system comprises a balance bar and one or more brace bars.

Preferably, the balance system comprises one or more weighted sleeves.

Preferably, the flow meter comprises a Coriolis flow meter.

Preferably, the flow meter comprises two or more flow tubes.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
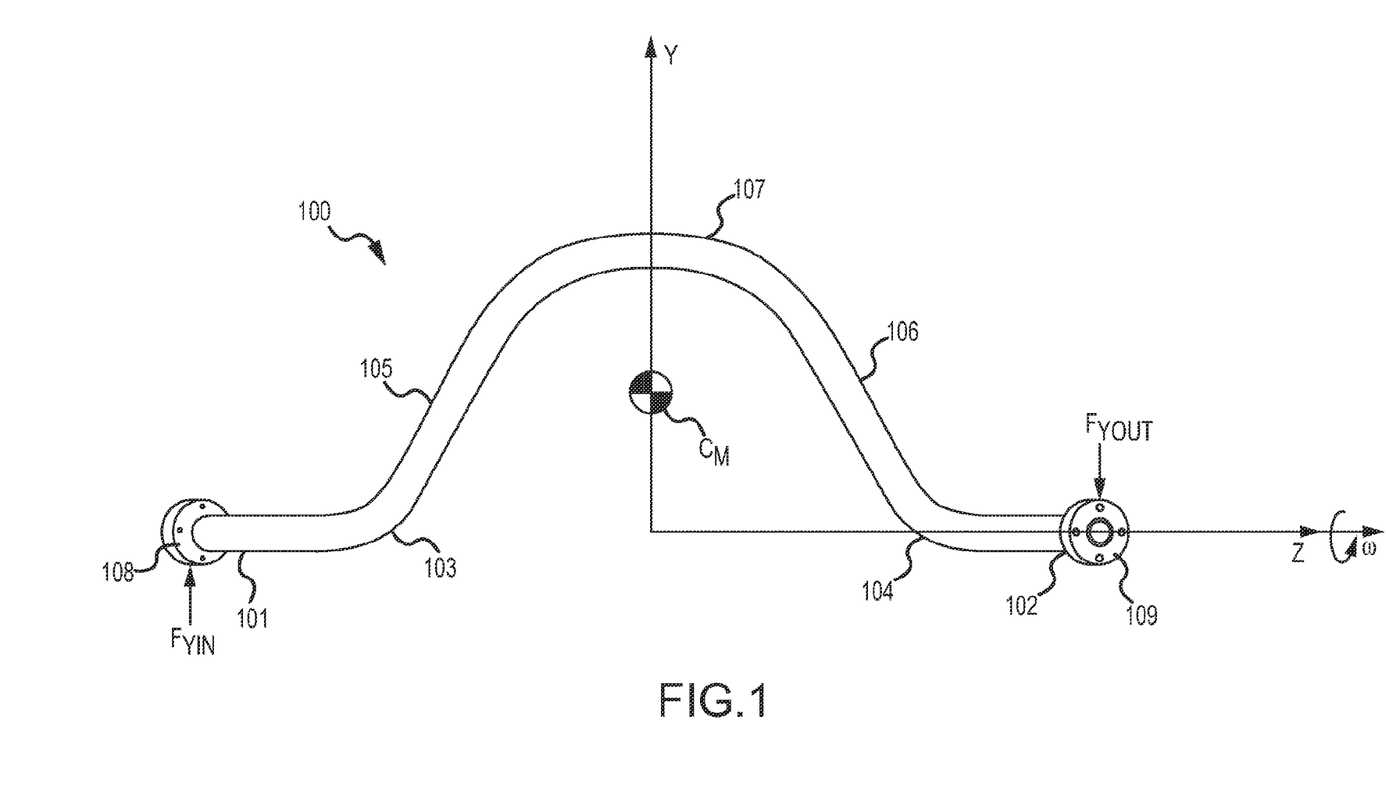
FIG. 1 shows a flow meter 100.

FIG. 1 shows a flow tube 100. The flow tube 100 includes an inlet section 101, an outlet section 102, a first bent section 103, a second bent section 104, a first straight section 105, a second straight section 106, and a curved vertex section 107. The inlet section 101 and the outlet section 102 are axially aligned and join an inlet and outlet manifold 108, 109 respectively. The inlet and outlet manifolds 108, 109 couple the flow tube 100 to a pipeline (not shown) or other transport system to convey material, e.g., fluids, slurries and the like, in the system. The first bent section 103 is coupled to the inlet section 101. The second bent section 104 is coupled to the outlet section 102. The first straight section 105 is coupled to the first bent section 103. The second straight section 106 is coupled to the second bent section 104. The curved vertex section 107 is coupled to the first and second straight sections 105, 106. The curved vertex section 107 may take the shape of a circle segment or may take other curved shapes. In one example, the curved vertex section 107 would couple directly to the first and second bent sections 103, 104.

As shown in FIG. 1, the flow tube 100 is shown with respect to a X-Y-Z coordinate system. While the figure shows the flow tube 100 as lying in the Y-Z plane, it should be understood that the coordinate system chosen is merely illustrative and other coordinate systems could be used. The flow tube 100 is formed in essentially one plane (shown as the Y-Z plane in FIG. 1). Typically, the flow tube 100 would also include one or more drivers (not shown) and one or more pickoffs, (not shown) and other measuring equipment. These components have been omitted for simplicity, but it should be understood that these components would typically be present when the flow tube 100 is in operation. When the flow tube 100 is vibrated using a driver (not shown) during operation, the flow tube 100 vibrates in the X-direction. Other directions include the Z-direction along the pipeline and the Y-direction that is perpendicular to the X and Z-directions. As shown, when the flow tube 100 is vibrated, it rotates substantially about an axis of rotation, which is substantially along the pipeline, or as shown, along the inlet and outlet sections 101, 102. As shown in the figure, the axis of rotation is the Z-axis. It should be understood that the Z-axis is chosen for the purpose of describing the flow tube characteristics and other coordinate systems could be chosen. Therefore, the use of the Z-axis should not limit the scope of the invention.

Because the flow tube 100 is curved, the center of mass $C_m$ is located somewhere above the axis of rotation (Z-axis). Because the flow tube 100 is substantially symmetrical about both the X-axis and the Y-axis, the discussion is limited to the center of mass with respect to the Z-axis. The offset center of mass $C_m$ causes a problem because as the flow tube 100 vibrates, the offset center of mass $C_m$ can result in vibrations in the Y-direction. In some cases, the offset center of mass $C_m$ can result in vibrations in the X-direction as well, however, the greatest vibrations have been realized in the Y-direction and therefore, the following discussion is limited to the Y-direction vibrations. However, it should be understood that the discussion is equally applicable to X-direction vibrations. These vibrations can produce meter errors, decrease the life of the flow meter, or damage components of the flow meter.

At this point it is important to understand the forces that are created by the Y-direction and X-direction vibrations. The Y-direction vibrations result in reaction forces $Fy_{in}$ and $Fy_{out}$ created at the inlet section 101 and outlet section 102 of the flow tube 100 respectively. In the embodiment shown, the reaction forces $Fy_{in}$ and $Fy_{out}$ act at the flanges 108, 109 respectively. As mentioned above, although the figures only show the reaction forces $Fy_{in}$ and $Fy_{out}$ in the Y-direction, it should be appreciated that there are reaction forces $Fx_{in}$, and $Fx_{out}$ in the X-direction. Because of the Coriolis forces created by the flowing fluid acting on the flow tube 100, the reaction force at the inlet section 101 are typically in the +Y and +X directions, while the reaction force at the outlet section 102 is typically in the −Y and −X directions. However, the opposite may be true, or the reaction forces may be seen in the same direction.

In order to minimize the reaction forces, it is important to know how to characterize them. As mentioned above, the fluid flowing through the flow tube 100 is flowing in the +Z-direction. It is generally known in the art that fluid flow in a vibrating pipeline will create an angular velocity ω. Additionally, it is known in the art that the flow tube 100 has a moment of inertia I in each plane. Therefore, there is an $I_{yz}$, $I_{xz}$, and $I_{xy}$. From the angular velocity ω and the moment of inertia I, a moment about each axis can be determined using the following equations:

$$\Sigma M_x = -I_{xz}\dot{\omega} + I_{yz}\omega^2 \qquad (1)$$

$$\Sigma M_y = -I_{yz}\dot{\omega} + I_{xz}\omega^2 \qquad (2)$$

$$\Sigma M_z = I_{zz}\dot{\omega} \qquad (3)$$

where:
M is the moment about the axis;
I is the moment of inertia;
ω is the angular velocity; and
$\dot{\omega}$ is the angular acceleration.

However, equations 1-3 can be simplified by making the basic assumption that the angular velocity ω is constant which means that the angular acceleration $\dot{\omega}$ is zero. In that situation, equations 1-3 can be shown as $$\Sigma M_x = I_{yz}\omega^2 \qquad (4)$$

$$\Sigma M_y = I_{xz}\omega^2 \qquad (5)$$

$$\Sigma M_z = 0 \qquad (6)$$

With the moments about each axis characterized in terms of moment of inertia I and angular velocity ω, the reaction forces can be characterized in terms of moment of inertia I and angular velocity ω for any direction. This is because of the generally known equation of:

$$M = Fd \qquad (7)$$

where:
F is force; and
d is distance.
Therefore, based on equations 4 and 7, $Fy_{in}$ and $Fy_{out}$ can be characterized as:

$$Fy_{in} = \frac{I_{yz}\omega^2}{d} \qquad (8)$$

$$Fy_{out} = -\frac{I_{yz}\omega^2}{d} \qquad (9)$$

With equations 8 and 9, it can be seen that if the moment of inertia in the y-z plane is minimized, the reaction forces $Fy_{in}$ and $Fy_{out}$ will also be minimized. The moment of inertia $I_{yz}$ can be minimized by repositioning the center of mass $C_m$ along the axis of rotation.

Figure 2:
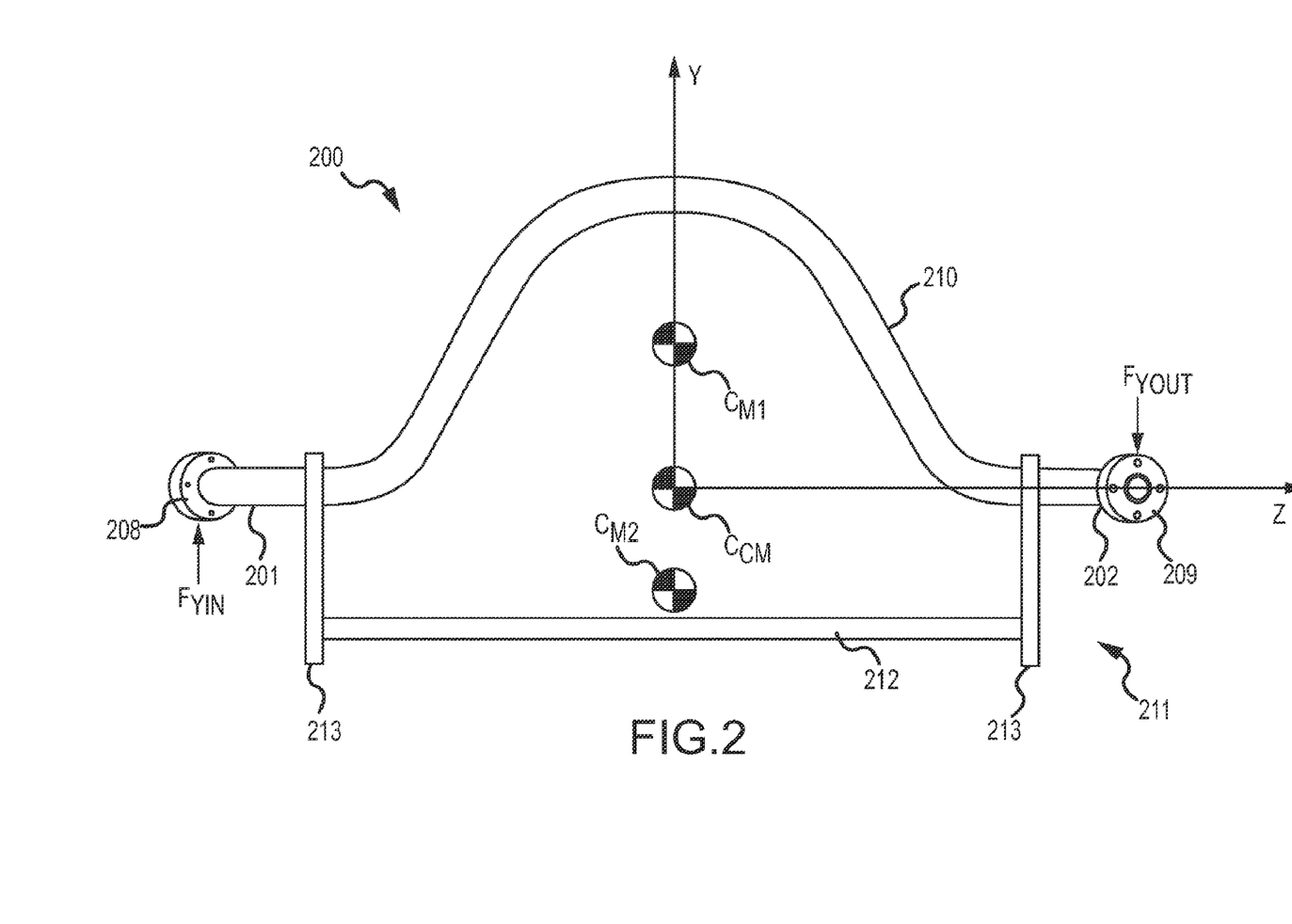
FIG. 2 shows a flow meter 200 according to an embodiment of the invention.

FIG. 2 shows a flow meter 200 according to an embodiment of the invention. According to one embodiment of the invention, the flow meter 200 comprises a Coriolis mass flow meter. However, the flow meter 200 could comprise other types of flow meters and the present invention should not be limited to Coriolis mass flow meters. The flow meter 200 comprises a flow tube 210 and a balance system 211. While the flow meter 200 is shown as with a single flow tube 210, it should be understood that in other embodiments, the flow meter 200 includes more than one flow tube 210. For example, according to some embodiments, the flow meter 200 comprises a dual flow tube meter (See FIG. 5).

The balance system 211 is coupled to the flow tube 210. As shown, the flow tube 210 still has a center of mass $C_{m1}$ that is in substantially the same location as shown in FIG. 1. However, the balance system 211 also has a center of mass $C_{m2}$. Therefore, when the balance system 211 is coupled to the flow tube 210, the flow meter 200 has a combined center of mass $C_{cm}$. In the embodiment shown, the balance system 211 is sized and located such that the combined center of mass $C_{cm}$ is located proximate the axis of rotation (the Z-axis as shown in FIG. 2). It should be understood that while it is advantageous to position the combined center of mass $C_{cm}$ exactly on the axis of rotation, design constraints may limit the feasibility of this. However, the closer the combined center of mass $C_{cm}$ is to the axis of rotation, the smaller the moment of inertia $I_{yz}$ will be, and therefore, the smaller the reaction forces $Fy_{in}$ and $Fy_{out}$. Therefore, as the combined center of mass $C_{cm}$ is repositioned closer to the axis of rotation, the reaction forces $Fy_{in}$, $Fx_{in}$ and $Fy_{out}$, $Fx_{out}$ are minimized.

Additionally, by positioning the combined center of mass $C_{cm}$ proximate the axis of rotation, the flow meter 200 is less affected by fluid density changes. This is because fluid density changes the center of mass of the flow meter 200 only slightly. With the combined center of mass $C_{cm}$ of the flow meter 200 lying proximate the axis of rotation, the moment of inertia is at a minimum and therefore the fluid density changes will have little affect on the meter.

While the discussion has only addressed repositioning the combined center of mass $C_{cm}$ with respect to the axis of rotation and has not mentioned the location of the combined center of mass $C_{cm}$ with respect to either the X-axis or the Y-axis, as mentioned above with respect to flow tube 100, because the flow meter 200 is substantially symmetrical with respect to both of these axes, little needs to be done for repositioning of the center of mass. However, in meters that lack such symmetry, the balance system 211 may be sized and located such that the flow meter 200 is balanced with respect to those axes as well.

According to an embodiment of the invention, the balance system 211 comprises a balance bar 212 and one or more brace bars 213. In the embodiment shown in FIG. 2, the balance system 211 includes two brace bars 213, one at each end of the flow tube. It should be understood however, that in other embodiments, more than two brace bars 213 are used and the number of brace bars should not limit the scope of the invention. According to an embodiment of the invention, the brace bars 213 can be coupled to both the balance bar 212 and the flow tube 210. The brace bars 213 may be coupled to the flow tube 210 using any known technique, such as for example, adhesives, bonding, brazing, welding, friction fitting, etc. The precise method used to couple the brace bars 213 to the flow tube 210 should not limit the scope of the invention. As shown, the brace bars 213 are coupled to the flow tube 210 near the inlet section 201 and the outlet section 202. The brace bars 213 may be coupled to the flow tube 210 in other sections along the flow tube 210 and the position of the brace bars 213 should not limit the scope of the invention.

According to an embodiment of the invention, the brace bars 213 are also coupled to the balance bar 212. Therefore, the brace bars 213 are used to couple the balance bar 212 to the flow tube 210. Again, the particular technique used to couple the brace bars 213 to the balance bar 212 is not important for the purposes of the present invention and therefore should not limit the scope of the invention. The important aspect of the balance system 211 is that it repositions the combined center of mass $C_{cm}$ proximate the axis of rotation. In doing so, the moment of inertia $I_{yz}$ is minimized, or in some cases brought to zero, which in turn minimizes the reaction forces $Fy_{in}$, $Fx_{in}$ and $Fy_{out}$, $Fx_{out}$.

Figure 3:
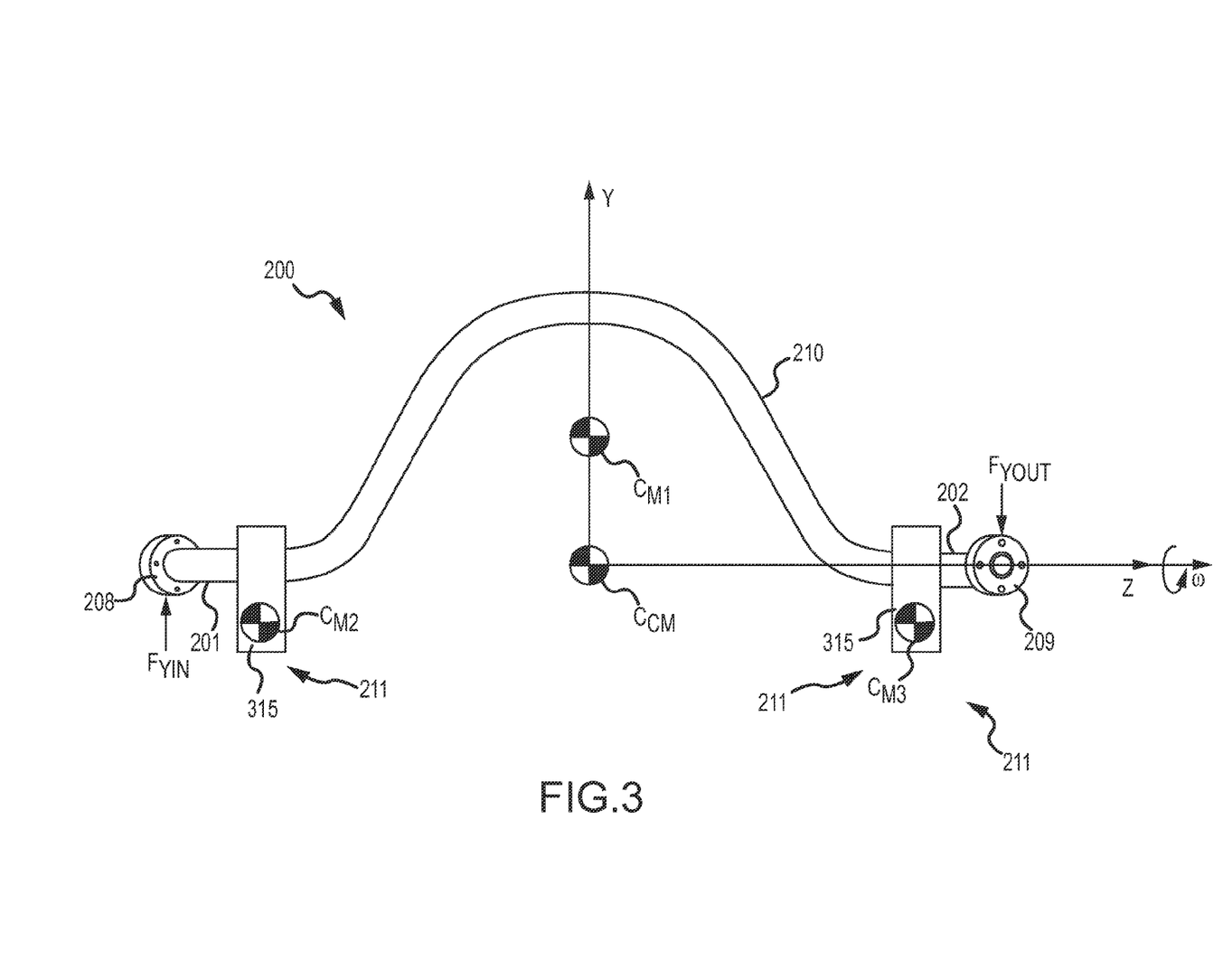
FIG. 3 shows the flow meter 200 according to another embodiment of the invention.

FIG. 3 shows the flow meter 200 according to another embodiment of the invention. The flow meter 200 of FIG. 3 is substantially the same as the flow meter 200 of FIG. 2 with the exception of the balance system 211. In the embodiment shown in FIG. 3, the balance system 211 comprises two weighted sleeves 315. While only two weighted sleeves 315 are shown, it should be understood that in other embodiments, more than two or alternatively, less than two weighted sleeves 315 may be used. The weighted sleeves 315 may be coupled to the flow tube 210 using any method generally known in the art. Furthermore, while the term "sleeve" is used, it should be understood that the weighted component need not completely surround the flow tube 210, but rather, in some embodiments, may be simply attached to a side of the flow tube 210.

The weighted sleeves 315 are coupled to the flow tube 210 near the inlet section 201 and the outlet section 202. The weighted sleeve 315 near the inlet section 201 has a center of mass $C_{m2}$ and the weighted sleeve 315 near the outlet section 202 has a center of mass $C_{m3}$. As can be seen, both the center of mass $C_{m2}$ and the center of mass $C_{m3}$ are positioned below the axis of rotation. Therefore, when coupled to the flow tube 210, which has the center of mass $C_{m1}$, the combined center of mass $C_{cm}$ of the flow meter 200 is positioned proximate the axis of rotation. The combined center of mass $C_{cm}$ of the flow meter 200 includes the center of mass $C_{m1}$ of the flow tube 210 and the centers of mass $C_{m2}$ and $C_{m3}$ of each of the weighted sleeve 315. Therefore, the balance system 211 using weighted sleeve 315 has substantially the same effect on the combined center of mass $C_{cm}$ as does the balance system 211 using the balance bar 212 and brace bars 213.

Figure 4:
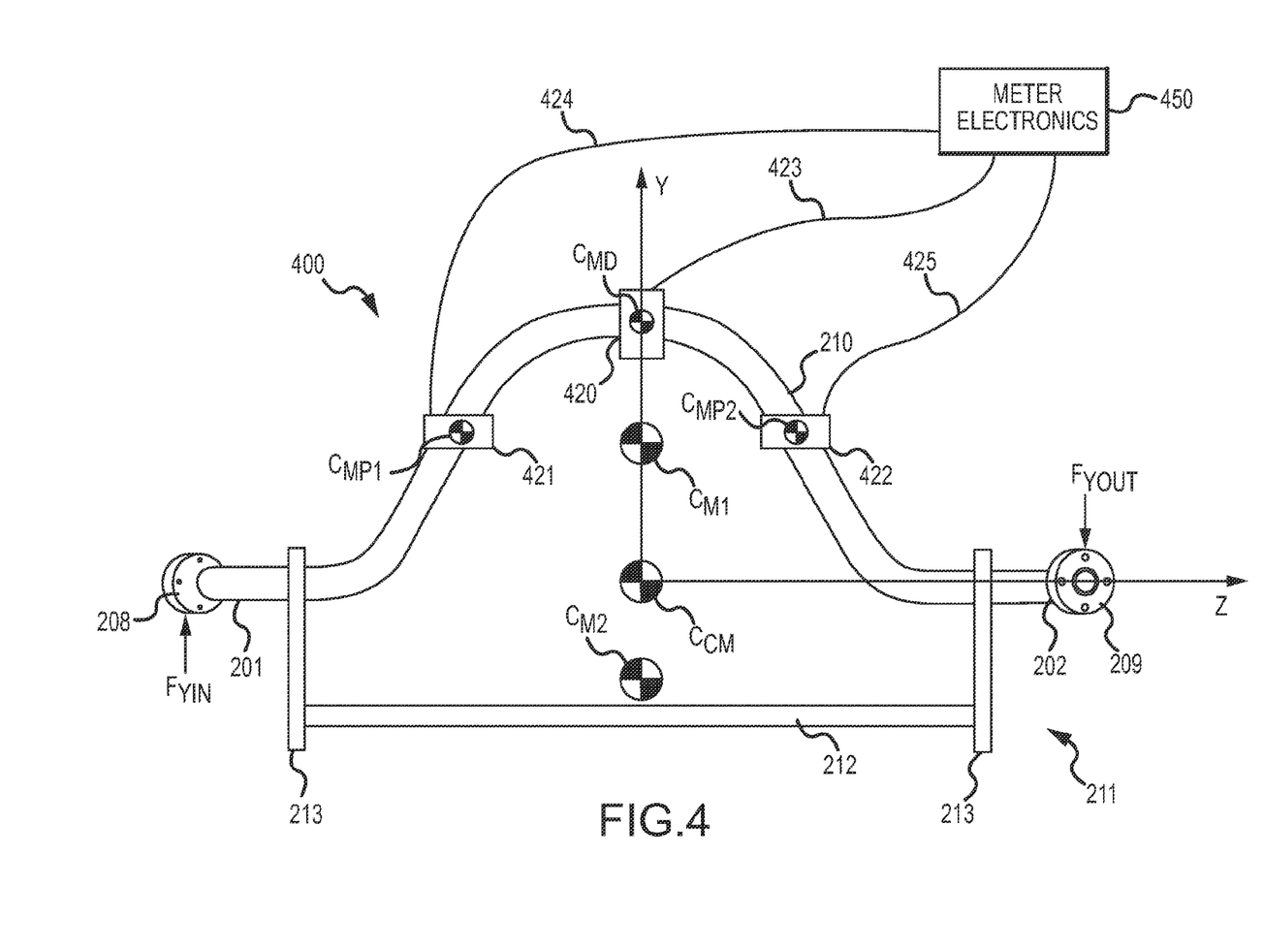
FIG. 4 shows a flow meter 400 according to an embodiment of the invention.

FIG. 4 shows the flow meter 400 according to another embodiment of the invention. Like the flow meter 200, the flow meter 400 may comprise a Coriolis flow meter. However, the flow meter 400 may comprise other types of flow meters and should not be limited to Coriolis flow meters. While the flow meter 400 includes a flow tube 210 similar to the one shown in FIGS. 2 & 3, the flow meter 400 also includes a driver 420 and pickoffs 421, 422. The driver 420 and pickoffs 421, 422 are connected to meter electronics 450 via leads 423, 424, and 425. Meter electronics 450 can provide density, mass flow rate, temperature, as well as other measurements. Although the driver 420 and the pickoffs 421, 422 have a counterparts, the other half of these components are not attached to the flow tube 210 and thus have been omitted for the purpose of clarity.

The driver 420 and the pickoffs 421, 422 are coupled to the flow tube 210 according to methods generally known in the art. Because these components are coupled to the flow tube 210, they add to the mass of the flow meter 400. For example, driver 420 has a center of mass $C_{mD}$, the pickoff 421 has a center of mass $C_{mp1}$, and the pickoff 422 has a center of mass $C_{mp2}$. Additionally, the flow tube 210 still has a center of mass $C_{m1}$. Therefore, according to an embodiment of the invention, the balance system 211 is sized and located to compensate for the center of mass of the flow tube $C_{m1}$, the center of mass of the driver $C_{mD}$, and the centers of mass of the pickoffs $C_{mp1}$, $C_{mp2}$. Thus, the balance system 211 in FIG. 4, must be of a greater mass or alternatively, offset from the flow tube 210 a greater distance than the balance system 211 in FIG. 2 in order to reposition the combined center of mass $C_{cm}$ of the flow meter 400 proximate the axis of rotation. It should be understood that while the flow meter 400 is shown with the balance system 211 comprising the balance bar 212 and the brace bars 213, the flow meter 400 could alternatively comprise the weighted sleeves 315.

Figure 5:
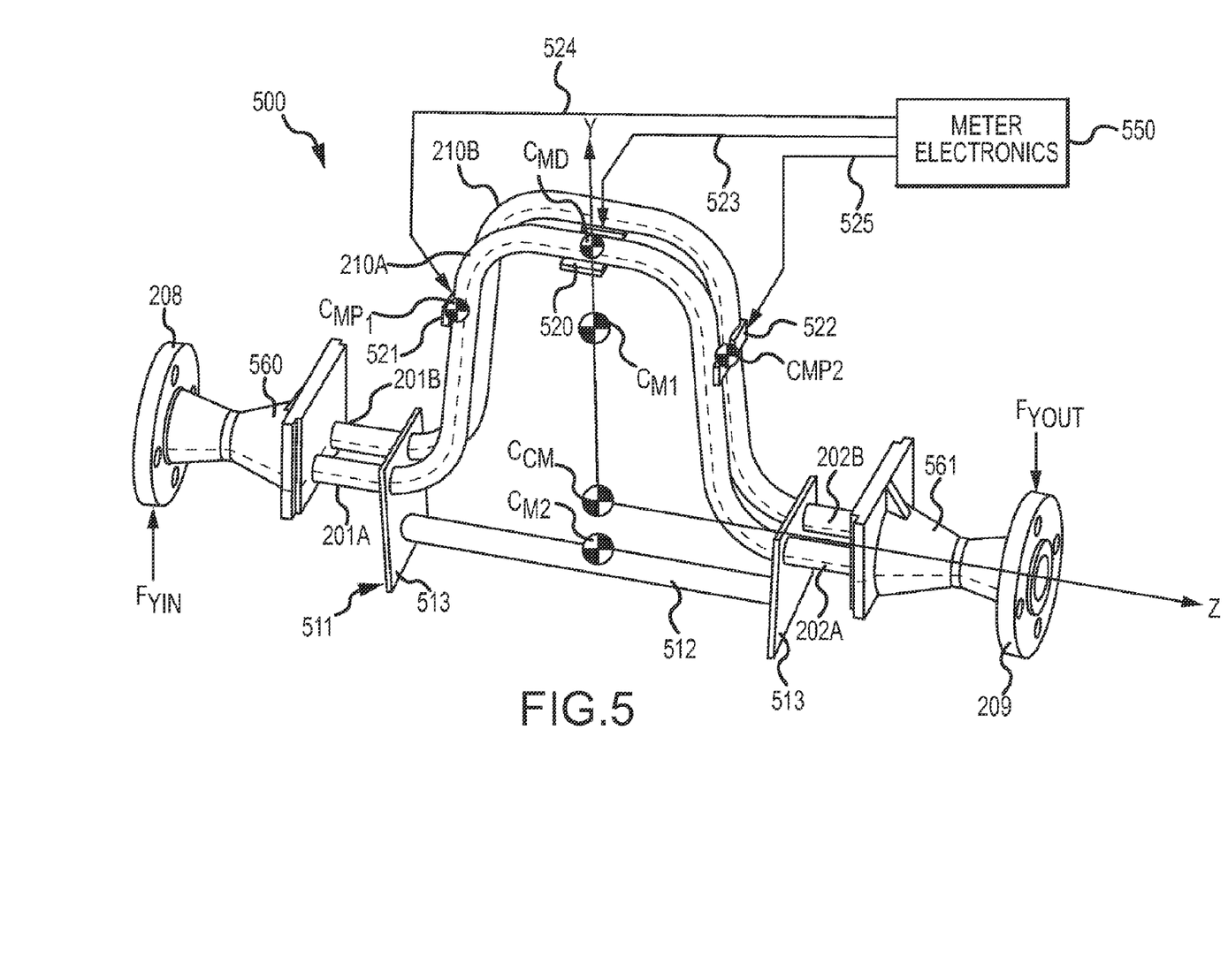
FIG. 5 shows a flow meter 500 according to an embodiment of the invention.

FIG. 5 shows a flow meter 500 according to an embodiment of the invention. According to an embodiment of the invention, the flow meter 500 comprises a Coriolis flow meter. However, flow meter 500 could comprise other types of flow meters and the present invention should not be limited to Coriolis flow meters. The flow meter 500 is similar to the flow meters shown in FIG. 1-4, except the flow meter 500 comprises a dual tube flow meter rather than a single tube flow meter. Therefore, in addition to the components of the previous flow meters, the flow meter 500 includes an inlet manifold 560 and an outlet manifold 561. The inlet manifold 560 separates the fluid entering the flow meter 500 and diverts the fluid into either a first inlet section 201A and a second inlet section 201B representing the inlet to a first flow tube 210A and a second flow tube 210B respectively. The outlet manifold 561 is provided to recombine the fluid prior to exiting the flow meter 500.

In addition to the first and second flow tubes 210A, 210B, the flow meter 500 also includes a balance system 511. Additionally, FIG. 5 shows a driver 520 and pickoffs 521, 522. The driver 520 and pickoffs 521, 522 are connected to meter electronics 550 in a similar manner as discussed with references to FIG. 4. The driver 520 and pickoffs 521, 522 are coupled to the flow tubes 210A and 210B in methods generally known in the art. Because these components are coupled to the flow tubes 210A, 210B, they add to the mass of the flow meter 500. For example, the driver 520 has a center of mass $C_{MD}$, the pickoff 521 has a center of mass $C_{MP1}$, and the pickoff 522 has a center of mass $C_{MP2}$. Additionally, each flow tube 210A and 210B has a center of mass (not shown) independent of the driver 520 and pickoffs 521, 522. The center of mass of the flow tubes 210A, 210B, the driver 520, and pickoffs 521, 522 is represented as $C_{M1}$.

According to the embodiment shown, this center of $C_{M1}$ is shown to lie between the flow tubes 210A, 210B, but above the axis of rotation of the system. Therefore, the flow meter 500 includes the balance system 511. The balance system 511 includes a center of mass $C_{M2}$, which is located between the two flow tubes 210A, 210B, but below the axis of rotation. According to an embodiment of the invention, the balance system 511 is sized and located such that a combined center of mass $C_{cm}$, of the flow meter 500 lies proximate an axis of rotation. It should be appreciated that the balance system 511 is provided to serve substantially the same purpose as the balance system 211, except the balance system 511 is sized and located on the flow meter 500 to accommodate a dual flow tube flow meter. Similarly, while the flow meter 500 is shown with a driver 520 and pickoffs 521, 522, in other embodiments, the balance system 511 is sized and located to reposition the center of mass $C_{CM}$ of the flow meter 500 without taking into account the mass of the driver 520 and pickoffs 521, 522.

In the embodiment shown, the balance system comprises a balance bar 512 and one or more brace bars 513 on each end of the flow meter. However, in other embodiments the balance system 511 comprises one or more weighted sleeves similar to the weighted sleeves 315 shown in FIG. 3.

The above description provides balance systems 211 and 511 for a flow meter that is capable of repositioning the center of mass of the flow meter so that it lies proximate the axis of rotation. In doing so, the reaction forces $Fy_{in}$, $Fx_{in}$ and $Fy_{out}$, $Fx_{out}$ are minimized. Additionally, the undesired Y-direction and X-direction vibrations are also minimized. This not only provides for more accurate measurements of the flow meter, but also extends the life of the flow meter assembly. Additionally, changes in the meter's performance due to fluid density changes are also minimized. It should be understood that the particular configuration of the balance systems 211 and 511 have been shown as merely examples and other configurations are known that are capable of repositioning the combined center of mass of the flow meter system so that it lies proximate the axis of rotation. These other configurations are within the scope of the claims and therefore, the invention should not be limited to the example embodiments shown. Furthermore, while the above discussion has been directed to vibrating flow meters, such as Coriolis flow meters, the balance systems 211 and 511 are equally applicable to other flow meters.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other flow meters, and not just to the embodiments described above and shown in the accompanying figures. Accordingly, the scope of the invention should be determined from the following claims.

We claim:

1. A flow meter (200), comprising;
   a flow tube (210); and
   a balance system (211) coupled to the flow tube (210), wherein the balance system (211) is sized and located such that the combined center of mass ($C_{cm}$) of the flow tube (210) and the balance system (211) lies proximate an axis of rotation of the flow tube (210).

2. The flow meter (200) of claim 1, wherein the balance system (211) comprises a balance bar (212) and one or more brace bars (213).

3. The flow meter (200) of claim 1, wherein the balance system (211) comprises one or more weighted sleeves (315).

4. The flow meter (200) of claim 1, wherein the flow meter (200) comprises a Coriolis flow meter (200).

5. The flow meter (200) of claim 1, wherein the flow meter (200) comprises two or more flow tubes (210A, 210B).

6. A flow meter (400), comprising:
   a flow tube (210);
   a driver (420);
   one or more pickoffs (421, 422); and
   a balance system (211) coupled to the flow tube (210), wherein the balance system (211) is sized and located such that the combined center of mass ($C_{cm}$) of the flow meter (400) lies proximate an axis of rotation of the flow tube (210).

7. The flow meter (400) of claim 6, wherein the balance system (211) comprises a balance bar (212) and one or more brace bars (213).

8. The flow meter (400) of claim 6, wherein the balance system (211) comprises one or more weighted sleeves (315).

9. The flow meter (400) of claim 6, wherein the flow meter (400) comprises a Coriolis flow meter (400).

10. The flow meter (400) of claim 6, wherein the flow meter (400) comprises two or more flow tubes (210A, 210B).

11. A method for balancing a flow meter having a flow tube, the method comprising the steps of:
    coupling a balance system to the flow tube with the balance system sized and located such that the combined center of mass of the flow tube and the balance system lies proximate an axis of rotation of the flow tube.

12. The method of claim 11, wherein the balance system comprises a balance bar and one or more brace bars.

13. The method of claim 11, wherein the balance system comprises one or more weighted sleeves.

14. The method of claim 11, wherein the flow meter comprises a Coriolis flow meter.

15. The method of claim 11, wherein the flow meter comprises two or more flow tubes.

16. A method for balancing a flow meter having a flow tube and a drive system, the method comprising the steps of:
    coupling a balance system to the flow conduit with the balance system sized and located such that the combined center of mass of the flow tube, the drive system, and the balance system lies proximate an axis of rotation of the flow tube.

17. The method of claim 16, wherein the balance system comprises a balance bar and one or more brace bars.

18. The method of claim 16, wherein the balance system comprises one or more weighted sleeves.

19. The method of claim 16, wherein the flow meter comprises a Coriolis mass flow meter.

20. The method of claim 16, wherein the flow meter comprises two or more flow tubes.

* * * * *